P. M. KINSELLA.
Brakes for Steering Wheels.

No. 158,091.

Patented Dec. 22, 1874.

Attest:
Edward Barthel.
E. S. Questin

Inventor:
P. M. Kinsella
By Attorney
Thos. S. Sprague

UNITED STATES PATENT OFFICE.

PATRICK M. KINSELLA, OF DETROIT, MICHIGAN.

IMPROVEMENT IN BRAKES FOR STEERING-WHEELS.

Specification forming part of Letters Patent No. 158,091, dated December 22, 1874; application filed July 24, 1874.

*To all whom it may concern:*

Be it known that I, PATRICK M. KINSELLA, of Detroit, in the county of Wayne and State of Michigan, have invented an Improvement in Wheels for Steering Vessels, of which the following is a specification:

The nature of this invention relates to certain new and useful improvements in the construction of pilot-wheels; and the invention consists in the attachment to said wheels of devices by means of which the pilot has a more certain control of the wheel, as more fully hereinafter described.

In heavy weather it is frequently necessary to send several men to the wheel to the assistance of the pilot. A heavy sea will sometimes strike the vessel and rudder with such force as to tear the wheel from the hands of the men. The object of this invention is to prevent such disasters, and to give the men at the wheel perfect control of it.

Figure 1:
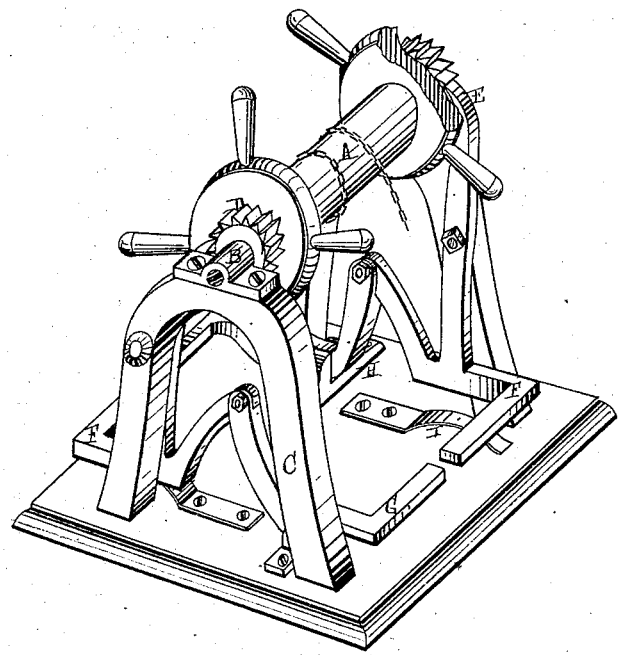
Figure 2:
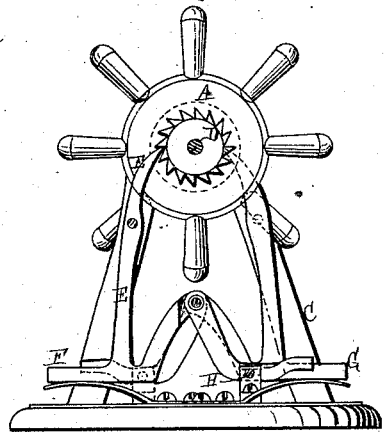

Figure 1 is a perspective view of a wheel with my devices attached. Fig. 2 is an end elevation with the frame removed.

Like letters refer to like parts in each figure.

In the drawings, A represents a wheel of the ordinary construction, except as hereinafter mentioned, and supported at each end by journals in the boxes B on the frame or standard C. Rigidly secured to the shaft or to the ends of the drum of the wheel, and between the bearings and wheel, one on each end, are ratchet-wheels D, the teeth of one pointing in opposite directions to the other. E are pawls or dogs, one for each of the ratchet-wheels, and so arranged that when both are in engagement with said ratchet-wheels the wheel A will be held rigidly in place, so that it cannot be turned. The lower ends of these pawls are rigidly connected with treadles F, and so arranged that, the treadles, or either of them, being depressed, the dog or dogs are disengaged from the engagement with the ratchet-wheels. Pivoted to these treadles are the supplementary treadles G, so arranged that each dog may be operated from either side of the wheel. The latter-named treadles are pivoted to and supported in suitable bearings H. When the foot is removed from either of the treadles, the springs I, one of which is placed and secured beneath the treadle F, raise the same and cause the dog to re-engage with the ratchet-wheel.

These treadles may be so arranged, if desired, that they may be operated from the ends of the wheel instead of from the sides, as shown.

One of the dogs being disengaged, the wheel may be turned to starboard, while the engagement of the other dog will prevent a lurch of the rudder to the larboard by a heavy sea or other accident.

The operation of this device is so simple and so effective that any one skilled in the art will readily understand it from the drawings.

Cams suitably secured in place of the ratchet-wheels may be used, if desired.

What I claim as my invention, and desire to secure by Letters Patent, is—

In combination with a pilot's steering wheel or drum, a pair of ratchet-wheels and dogs, operated by suitable treadles, substantially as described, and for the purposes set forth.

PATRICK M. KINSELLA.

Witnesses:
H. S. SPRAGUE,
WM. P. SPALDING.